United States Patent
Yonemaru

(10) Patent No.: US 11,892,615 B2
(45) Date of Patent: Feb. 6, 2024

(54) IMAGE PROCESSING METHOD FOR MICROSCOPIC IMAGE, COMPUTER READABLE MEDIUM, IMAGE PROCESSING APPARATUS, IMAGE PROCESSING SYSTEM, AND MICROSCOPE SYSTEM

(71) Applicant: Evident Corporation, Nagano (JP)

(72) Inventor: Yasuo Yonemaru, Tokyo (JP)

(73) Assignee: Evident Corporation, Nagano (JP)

( * ) Notice: Subject to any disclaimer, the term of this patent is extended or adjusted under 35 U.S.C. 154(b) by 287 days.

(21) Appl. No.: 17/518,916

(22) Filed: Nov. 4, 2021

(65) Prior Publication Data

US 2022/0057620 A1 Feb. 24, 2022

Related U.S. Application Data

(63) Continuation of application No. PCT/JP2020/018743, filed on May 8, 2020.

(30) Foreign Application Priority Data

May 10, 2019 (JP) .................................. 2019-089555

(51) Int. Cl.
*G02B 21/36* (2006.01)
*G06T 5/20* (2006.01)
(Continued)

(52) U.S. Cl.
CPC ......... *G02B 21/367* (2013.01); *G02B 21/364* (2013.01); *G06T 5/20* (2013.01);
(Continued)

(58) Field of Classification Search
CPC ...... G02B 21/364; G02B 21/367; G06T 5/20; G06T 5/50; G06T 7/00; G06T 2207/10056; G06T 2207/10064
See application file for complete search history.

(56) References Cited

U.S. PATENT DOCUMENTS 5,681,112 A * 10/1997 Kuroda ..................... G06T 5/20
382/274
7,064,813 B2 6/2006 Takahashi et al.
(Continued)

FOREIGN PATENT DOCUMENTS

JP 2000327105 A 11/2000
JP 2000347105 A 12/2000
(Continued)

OTHER PUBLICATIONS

Japanese Office Action dated Feb. 14, 2023 (and English translation thereof) issued in counterpart Japanese Application No. 2019-089555.
(Continued)

*Primary Examiner* — Brian P Yenke
(74) *Attorney, Agent, or Firm* — Holtz, Holtz & Volek PC

(57) ABSTRACT

An image processing method includes: generating two images by performing two image enhancement processes for a microscopic image; and generating a corrected image obtained by compositing the two images, wherein the generating the two images includes generating a high-frequency enhanced image in which high-frequency components of the microscopic image are enhanced relative to low-frequency components of the microscopic image that have a lower frequency than the high-frequency components, and generating a microstructure enhanced image in which a microstructure in an observation sample included in the microscopic image is enhanced.

20 Claims, 17 Drawing Sheets

(51) Int. Cl.
  *G06T 5/50* (2006.01)
  *G06T 7/00* (2017.01)
(52) U.S. Cl.
  CPC .............. *G06T 5/50* (2013.01); *G06T 7/00* (2013.01); *G06T 2207/10056* (2013.01); *G06T 2207/10064* (2013.01)

(56) References Cited

U.S. PATENT DOCUMENTS

| | | | | |
|---|---|---|---|---|
| 10,089,735 | B2* | 10/2018 | Nakajima | G06T 5/20 |
| 10,168,526 | B2* | 1/2019 | Aragaki | G06T 5/20 |
| 10,223,772 | B2* | 3/2019 | Onzon | G06T 3/4015 |
| 11,579,429 | B2* | 2/2023 | Amthor | G02B 21/0056 |
| 11,727,540 | B2* | 8/2023 | Tong | G06T 5/002 |
| | | | | 382/263 |
| 11,769,236 | B2* | 9/2023 | Amthor | G02B 21/361 |
| | | | | 348/79 |
| 2009/0220169 | A1 | 9/2009 | Bennett et al. | |
| 2013/0155203 | A1* | 6/2013 | Watanabe | H04N 13/207 |
| | | | | 348/49 |
| 2017/0024859 | A1* | 1/2017 | Schnitzler | G02B 21/367 |
| 2017/0154420 | A1* | 6/2017 | Barnes | G06T 7/11 |
| 2017/0363853 | A1* | 12/2017 | Besley | G06V 20/693 |
| 2020/0265566 | A1* | 8/2020 | Glotzbach | G06T 7/0002 |
| 2020/0310100 | A1* | 10/2020 | Ozcan | G03H 1/0443 |
| 2021/0183034 | A1* | 6/2021 | Chang | G06T 5/006 |
| 2021/0192721 | A1* | 6/2021 | Kemmochi | G06T 5/50 |
| 2022/0222822 | A1* | 7/2022 | Amthor | G06T 5/003 |
| 2022/0318969 | A1* | 10/2022 | Scherer | H04N 13/204 |
| 2022/0392031 | A1* | 12/2022 | Oshima | G06T 7/0012 |
| 2023/0196513 | A1* | 6/2023 | Ritschel | G06T 5/001 |
| | | | | 382/162 |

FOREIGN PATENT DOCUMENTS

| | | |
|---|---|---|
| JP | 2003130866 A | 5/2003 |
| JP | 2007328134 A | 12/2007 |
| JP | 2018013738 A | 1/2018 |

OTHER PUBLICATIONS

International Search Report (ISR) (and English language translation thereof) dated Jul. 28, 2020, issued in International Application No. PCT/JP2020/018743.

Written Opinion dated Jul. 28, 2020, issued in International Application No. PCT/JP2020/018743.

Kandel, et al., "Real-time halo correction in phase contrast imaging", Biomedical Optics Express, Feb. 1, 2018, p. 623-635.

* cited by examiner

IMAGE PROCESSING METHOD FOR MICROSCOPIC IMAGE, COMPUTER READABLE MEDIUM, IMAGE PROCESSING APPARATUS, IMAGE PROCESSING SYSTEM, AND MICROSCOPE SYSTEM

CROSS REFERENCE TO RELATED APPLICATIONS

This application is based upon and claims the benefit of priority of the prior Japanese Patent Application No. 2019-089555, filed May 10, 2019, the entire contents of which are incorporated herein by reference.

This is a Continuation Application of PCT Application No. PCT/JP2020/018743, filed May 8, 2020, which was not published under PCT Article 21(2) in English.

BACKGROUND OF THE INVENTION

Field of the Invention

The disclosure herein relates to an image processing method for a microscopic image, a computer readable medium, an image processing apparatus, an image processing system, and a microscope system.

Description of the Related Art

In the fields pertaining to examination of cultured cells, non-staining imaging, i.e., imaging for which staining is not required, such as phase-contrast observation and bright field observation using oblique illumination, has recently attracted attention. In a phase-contract image or a bright field image obtained using oblique illumination, however, an artifact could arise in the boundary portion between an observation sample and the background. Due to the artifact in the boundary portion, the observer could possibly misunderstand a microstructure in the observation sample. Thus, various techniques for reducing artifacts have been proposed.

Japanese Laid-open Patent Publication No. 2000-347105 describes a phase-contrast observation apparatus that reduces a halo, i.e., an example of an artifact, by adjusting the spectral transmittance characteristics of a phase film. A non-patent document (MIKHAIL E. KANDEL, MICHAEL FANOUS, CATHERINE BEST-POPESCU, AND GABRIEL POPESCU, "Real-time halo correction in phase contrast imaging", BIOMEDICAL OPTICS EXPRESS, Feb. 1, 2018, p. 623-635) describes a technique for reducing a halo through image processing.

SUMMARY OF THE INVENTION

An image processing method in accordance with an aspect of the present invention includes: generating two images by performing two image enhancement processes for a microscopic image; and generating a corrected image obtained by compositing the two images, wherein the generating the two images includes generating a high-frequency enhanced image in which high-frequency components of the microscopic image are enhanced relative to low-frequency components of the microscopic image that have a lower frequency than the high-frequency components, and generating a microstructure enhanced image in which a microstructure in an observation sample included in the microscopic image is enhanced.

A non-transitory computer readable medium in accordance with an aspect of the present invention has stored therein a program for causing a computer to perform: a process of generating two images by performing two image enhancement processes for a microscopic image, the process of generating including generating a high-frequency enhanced image in which high-frequency components of the microscopic image are enhanced relative to low-frequency components of the microscopic image that have a lower frequency than the high-frequency components, and generating a microstructure enhanced image in which a microstructure in an observation sample included in the microscopic image is enhanced; and a process of generating a corrected image obtained by compositing the two images.

An image processing apparatus in accordance with an aspect of the present invention includes: an image enhancement unit that generates two images by performing two image enhancement processes for a microscopic image; and a corrected-image generation unit that generates a corrected image obtained by compositing the two images. The image enhancement unit generates a high-frequency enhanced image in which high-frequency components of the microscopic image are enhanced relative to low-frequency components of the microscopic image that have a lower frequency than the high-frequency components, and generates a microstructure enhanced image in which a microstructure in an observation sample included in the microscopic image is enhanced.

An image processing system in accordance with an aspect of the present invention includes an image processing apparatus and a display apparatus that displays the corrected image. The image processing apparatus includes: an image enhancement unit that generates two images by performing two image enhancement processes for a microscopic image; and a corrected-image generation unit that generates a corrected image obtained by compositing the two images. The image enhancement unit generates a high-frequency enhanced image in which high-frequency components of the microscopic image are enhanced relative to low-frequency components of the microscopic image that have a lower frequency than the high-frequency components, and generates a microstructure enhanced image in which a microstructure in an observation sample included in the microscopic image is enhanced.

A microscope system in accordance with an aspect of the present invention includes an image processing apparatus and a microscope apparatus that obtains the microscopic image. The image processing apparatus includes: an image enhancement unit that generates two images by performing two image enhancement processes for a microscopic image; and a corrected-image generation unit that generates a corrected image obtained by compositing the two images. The image enhancement unit generates a high-frequency enhanced image in which high-frequency components of the microscopic image are enhanced relative to low-frequency components of the microscopic image that have a lower frequency than the high-frequency components, and generates a microstructure enhanced image in which a microstructure in an observation sample included in the microscopic image is enhanced.

A microscope system in accordance with another aspect of the present invention includes: a microscope apparatus that obtains a microscopic image; an image processing apparatus that generates a corrected image from the microscopic image obtained by the microscope apparatus; a display apparatus that displays the corrected image generated by the image processing apparatus; and an input apparatus that inputs information corresponding to a user operation to the image processing apparatus, wherein when the input apparatus has input information commanding to reduce an artifact that has arisen in the microscopic image, the image processing apparatus generates a high-frequency enhanced image in which high-frequency components of the microscopic image are enhanced relative to low-frequency components of the microscopic image that have a lower frequency than the high-frequency components and a microstructure enhanced image in which a microstructure in an observation sample included in the microscopic image is enhanced and generates the corrected image obtained by compositing the high-frequency enhanced image and the microstructure enhanced image.

BRIEF DESCRIPTION OF THE DRAWINGS

The present invention will be more apparent from the following detailed description when the accompanying drawings are referenced.

DESCRIPTION OF THE EMBODIMENTS

The technique described in the non-patent document (MIKHAIL E. KANDEL, MICHAEL FANOUS, CATHERINE BEST-POPESCU, AND GABRIEL POPESCU, "Real-time halo correction in phase contrast imaging", BIOMEDICAL OPTICS EXPRESS, Feb. 1, 2018, pages 623-635), i.e., the technique for reducing an artifact through image processing, is advantageous in that the artifact can be reduced without a change in the apparatus configuration. However, the effect of the reduction is limited, so a new image processing technique has been required for allowing for suppression of a decrease in the resolving power for a microstructure that is caused by an artifact.

The following describes embodiments of the present invention.

First Embodiment

Figure 1:
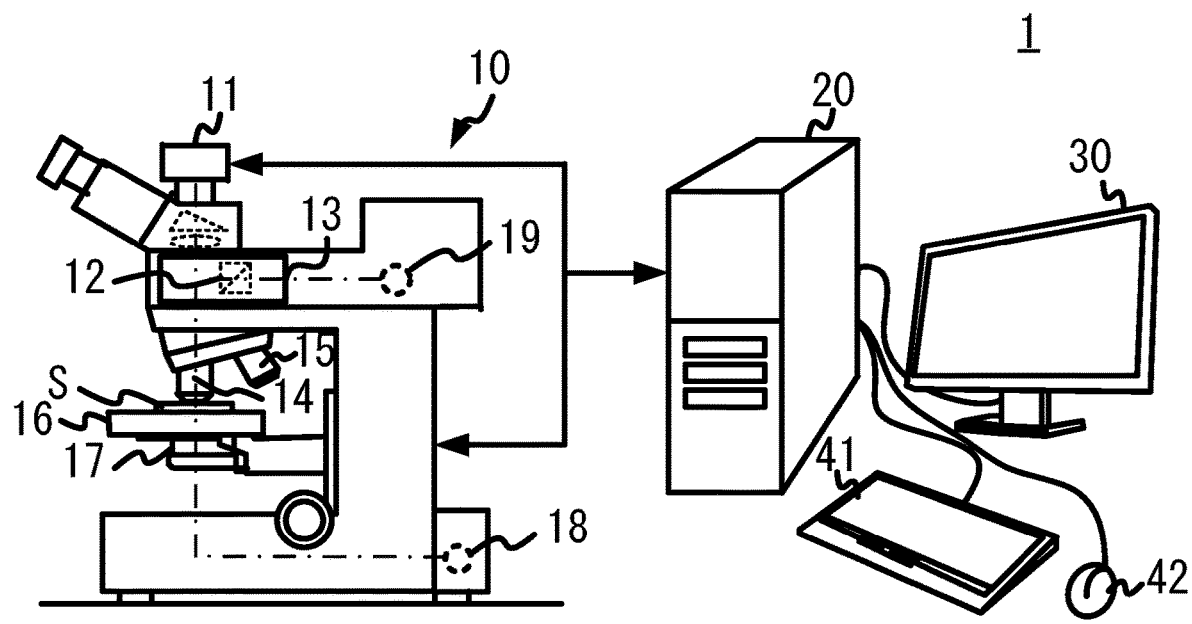
FIG. 1 illustrates an example of the configuration of a microscope system 1.
Figure 2:
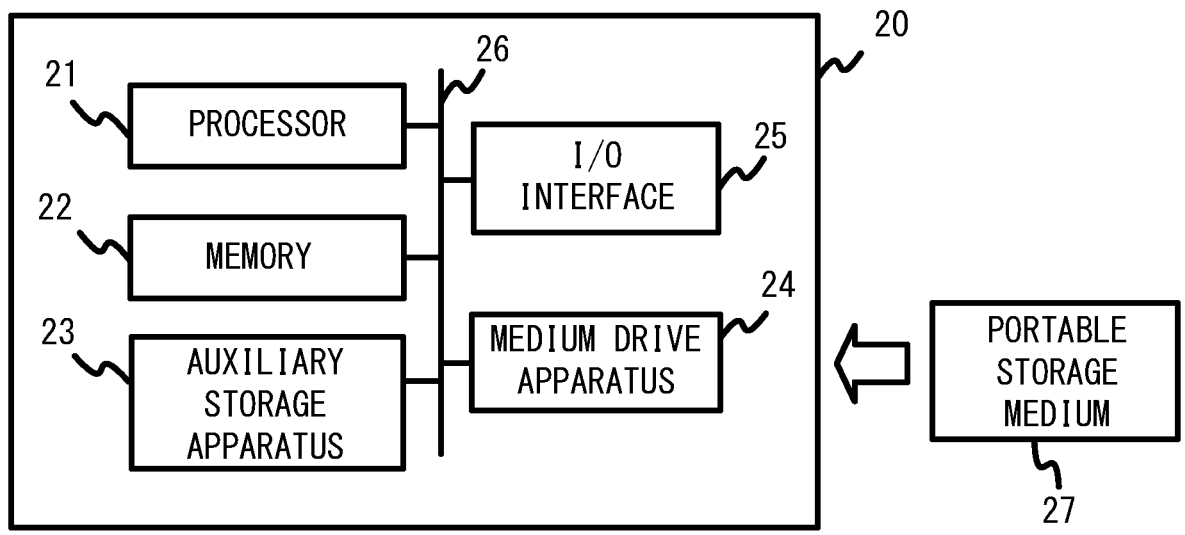
FIG. 2 illustrates an example of the physical configuration of an image processing apparatus 20.

FIG. 1 illustrates an example of the configuration of a microscope system 1. FIG. 2 illustrates an example of the physical configuration of an image processing apparatus 20. The following describes the configuration of the microscope system 1 by referring to FIGS. 1 and 2.

The microscope system 1 is an image processing system provided with the image processing apparatus 20 and, as depicted in FIG. 1, includes a microscope apparatus 10 and the image processing apparatus 20. The microscope system 1 may further include a display apparatus 30 and input apparatuses (keyboard 41, mouse 42).

The microscope apparatus 10 obtains a microscopic image. For example, the microscope apparatus 10 may include a digital camera 11, a fluorescent filter cube 12, a turret 13, objectives (phase-contrast objective 14, objective 15), a stage 16, a phase-contrast condenser 17, light sources (light sources 18 and 19).

For example, the digital camera 11 may include an image sensor that converts incoming observation light into an electric signal. The image sensor is a two-dimensional image sensor, e.g., a charge-coupled-device (CCD) image sensor, a complementary-metal-oxide-semiconductor (CMOS) image sensor. The digital camera 11 may be a color camera. The digital camera 11 obtains a microscopic image by capturing an image of a specimen S, i.e., an observation sample. The microscopic image obtained by the digital camera 11 is output therefrom to the image processing apparatus 20.

For example, the fluorescent filter cube 12 may include a dichroic mirror, an excitation filter, and an absorption filter. The fluorescent filter cube 12 is disposed in the turret 13 and can be inserted into, and removed from, an optical path. When the microscope apparatus 10 obtains a fluorescence image, the fluorescent filter cube 12 is disposed on the optical path. When the microscope apparatus 10 obtains a phase-contrast image, the fluorescent filter cube 12 is disposed outside the optical path.

The phase-contract objective 14 and the objective 15 are microscope objectives mounted on a revolver and switched with each other for use in accordance with an observation method. The phase-contrast objective 14 is used when obtaining a phase-contrast image. The phase-contrast objective 14 is provided with a phase film at a pupil position therein such that direct light and diffracted light have a phase difference therebetween. The objective 15 is used when obtaining a fluorescence image.

A specimen S is placed on the stage 16. The stage 16 may be a motorized stage or a manual stage. The phase-contrast condenser 17 is used when obtaining a phase-contrast image. The phase-contrast condenser 17 includes a ring slit at a position optically conjugate to the phase film provided inside the phase-contrast objective 14.

For example, the light sources 18 and 19 may be mercury lamps, xenon lamps, or LED light sources. The light sources 18 and 19 are switched with other for use in accordance with an observation method. The light source 18 is used when obtaining a phase-contrast image. The light source 18 performs transmitted illumination for the specimen S by using light emitted from the light source 18. The light source 19 is used when obtaining a fluorescence image. The light source 19 performs epi-illumination for the specimen S by using light emitted from the light source 19.

The microscope apparatus 10 can obtain both a phase-contrast image and a fluorescence image as microscopic images. The microscope apparatus 10 can make a selection as to which of a phase-contrast image or a fluorescence image is to be obtained, by switching an optical element (e.g., light source, objective) to be used. Thus, the microscope apparatus 10 includes a phase-contrast microscope for obtaining a phase-contrast image as a microscopic image and also includes a fluorescence microscope for obtaining a fluorescence image as a microscopic image.

The image processing apparatus 20 processes a microscopic image output from the microscope apparatus 10. When the microscopic image is a phase-contrast image, the image processing apparatus 20 performs image processing for suppressing a halo that arises in the boundary portion between the specimen S and the background. As a result of the image processing, the image processing apparatus 20 generates an image with a suppressed halo (hereinafter, "corrected image").

For example, the image processing apparatus 20 may be a standard computer. As depicted in FIG. 2, the image processing apparatus 20 includes a processor 21, a memory 22, an auxiliary storage apparatus 23, a medium drive apparatus 24 for driving a portable storage medium 27, and an I/O interface 25. These components are connected to each other by a bus 26.

For example, the processor 21 may be any processing circuit that includes a central processing unit (CPU) and a graphics processing unit (GPU). The processor 21 performs programmed processing by loading a program stored in the auxiliary storage apparatus 23 or the portable storage medium 27 into the memory 22 for execution. The processor 21 performs the programmed processing by executing the program. In this way, the processor 21 functions as functional components of the image processing apparatus 20 depicted in FIG. 3 (high-frequency enhancement unit 51, microstructure enhancement unit 52, corrected-image generation unit 53) (described hereinafter).

For example, the memory 22 may be a random access memory (RAM). In program execution, the memory 22 functions as a work memory for storing a program or data stored in the auxiliary storage apparatus 23 or the portable storage medium 27. For example, the auxiliary storage apparatus 23 may be a hard disk or a flash memory. The auxiliary storage apparatus 23 is used mainly to store various data and programs. The medium drive apparatus 24 accommodates the portable storage medium 27, e.g., an optical disc or Compact Flash®. The auxiliary storage apparatus 23 and the portable storage medium 27 are each an example of a non-transitory computer-readable storage medium having a program stored therein.

For example, the input/output (I/O) interface 25 may be a universal-serial-bus (USB) interface circuit or a High-Definition Multimedia Interface (HDMI)® circuit. The I/O interface 25 may have, for example, the microscope apparatus 10, the display apparatus 30, and the input apparatuses (keyboard 41, mouse 42) connected thereto.

The image processing apparatus 20 may include a network (NW) interface (not illustrated). For example, the NW interface may be a radio communication module or a local-area-network (LAN) card. The image processing apparatus 20 may receive data from an apparatus external to the microscope system 1 via the NW interface. The image processing apparatus 20 may transmit data obtained by the microscope system 1 to an external apparatus via the NW interface.

The configuration depicted in FIG. 2 is an example of the hardware configuration of the image processing apparatus 20. The image processing apparatus 20 is not limited to this configuration. The image processing apparatus 20 may not be a general-purpose apparatus but may be a special-purpose apparatus. For example, the image processing apparatus may include an exclusively designed electric circuit in place of, or in addition to, the processor 21 that reads and executes a software program.

The display apparatus 30 is, for example, a liquid crystal display, an organic electroluminescence display, or a cathode ray tube (CRT) display. The input apparatuses (keyboard 41, mouse 42) are directly operated by the user of the microscope system 1. The input apparatuses (keyboard 41, mouse 42) input information corresponding to a user operation to the image processing apparatus 20. The microscope system 1 may include another input apparatus, e.g., a joystick or a touch panel, in addition to, or in place of, the keyboard and the mouse.

Figure 3:
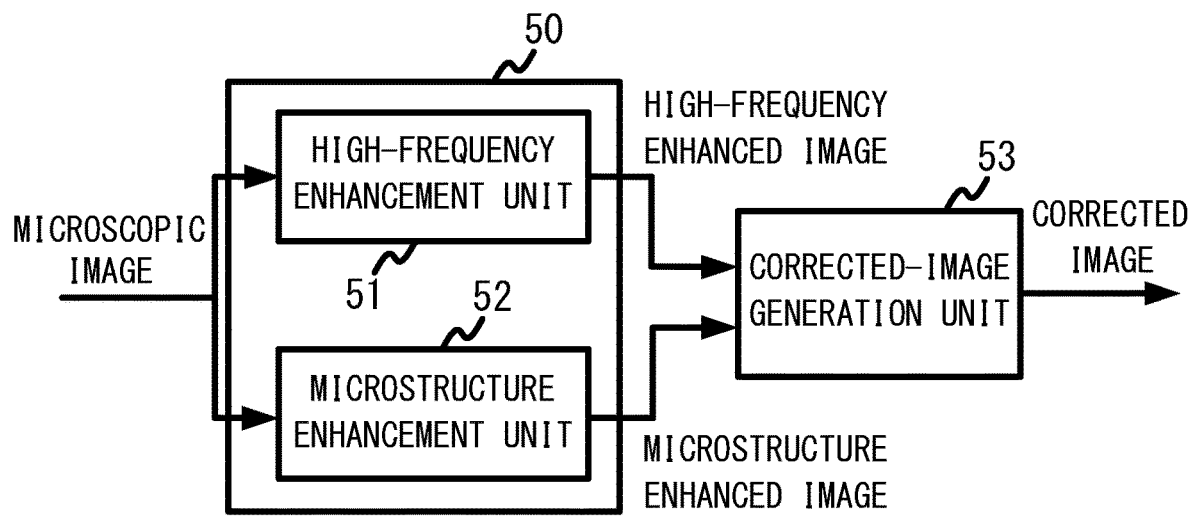
FIG. 3 illustrates an example of the functional configuration of an image processing apparatus 20.

FIG. 3 illustrates an example of the functional configuration of the image processing apparatus 20. FIGS. 4A-4D are explanatory diagrams for effects of image processing. As depicted in FIG. 3, the image processing apparatus 20 includes an image enhancement unit 50 and a corrected-image generation unit 53. The image enhancement unit 50 includes a high-frequency enhancement unit 51 and a microstructure enhancement unit 52.

Figure 4A:
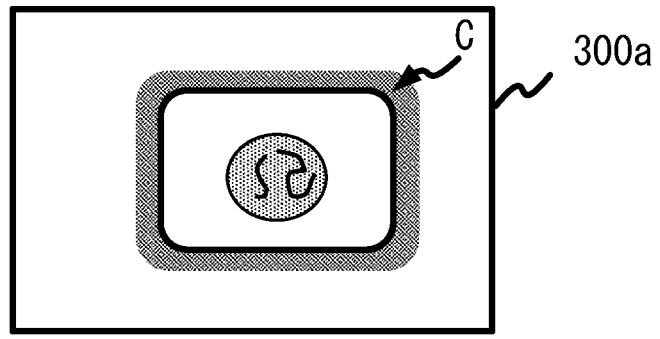
FIG. 4A is an explanatory diagram for an effect of image processing.

The image enhancement unit 50 generates two images by performing two image enhancement processes for a microscopic image. The high-frequency enhancement unit 51 generates a high-frequency enhanced image in which high-frequency components of the microscopic image are enhanced relative to low-frequency components of the microscopic image that have a lower frequency than the high-frequency components. The expression "high-frequency components are enhanced relative to low-frequency components" may mean increasing the level of the high-frequency components while maintaining the level of the low-frequency components, decreasing the level of the low-frequency components while maintaining the level of the high-frequency components, or decreasing the level of the low-frequency components and increasing the level of the high-frequency components. For example, the microscopic image may be a phase-contrast image obtained by the microscope apparatus 10. The frequency is a spatial frequency. An image 300a depicted in FIG. 4A is a schematic diagram of a phase-contrast image. The image 300a indicates that a dark portion is formed around a cell C due to a halo.

Figure 4B:
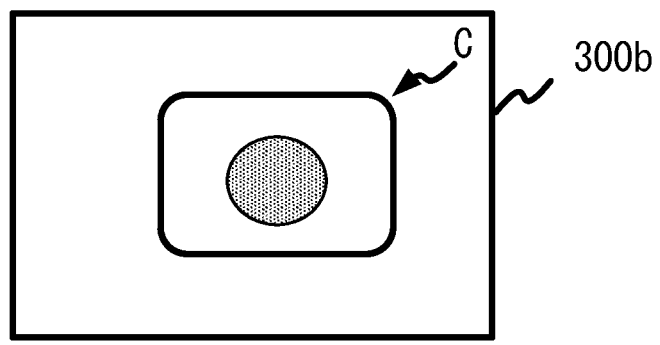
FIG. 4B is another explanatory diagram for an effect of image processing.

The frequency components of the halo, i.e., an artifact in the phase-contrast image, are distributed over a wide bandwidth, and the halo includes numerous components having a relatively low frequency. Accordingly, the high-frequency enhancement unit 51 selects low-frequency components and high-frequency components such that the main frequency components of the halo are included in the low-frequency components. In this way, a high-frequency enhanced image in which the halo is unnoticeable in comparison with the phase-contrast image obtained by the microscope apparatus 10 can be obtained. Thus, the high-frequency enhancement process performed by the high-frequency enhancement unit 51 has the effect of suppressing a halo. FIG. 4B depicts a schematic diagram of an image 300b output from the high-frequency enhancement unit 51. In the image 300b, the halo around the cell C is reduced in comparison with the image 300a, but microstructures such as minute organs in the cell C are difficult to be identified due to the processes performed by the high-frequency enhancement unit 51. This is because information on the microstructures is lost due to the high-frequency enhancement process. Setting a high boundary frequency between high-frequency components and low-frequency components so as to reduce a wider range of frequency components included in the halo will result in loss of more information on microstructures.

The microstructure enhancement unit 52 generates a microstructure enhanced image in which a microstructure in an observation sample included in a microscopic image is enhanced. For example, "a microstructure in an observation sample" may be a microstructure such as a minute cell organ in a cell. The expression "enhance a microstructure" may mean extracting at least a microstructure, and may include extracting only a microstructure.

Figure 4C:
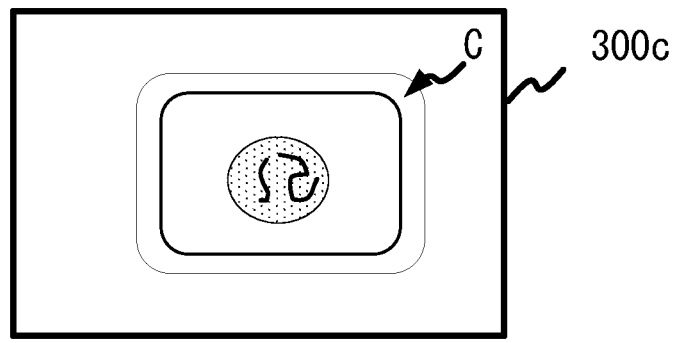
FIG. 4C is still another explanatory diagram for an effect of image processing.

The microstructure enhancement process performed by the microstructure enhancement unit 52 is a process of extracting a microstructure, so information on the microstructure that will be lost when generating a high-frequency enhanced image can be stored in advance by performing the microstructure enhancement process. FIG. 4C depicts a schematic diagram of an image 300C output from the microstructure enhancement unit 52. The image 300c is obtained by extracting mainly microstructures such as minute organs in the cell C.

The corrected-image generation unit 53 generates a corrected image obtained by compositing two images. In particular, the corrected-image generation unit 53 generates a corrected image obtained by compositing a high-frequency enhanced image and a microstructure enhanced image. The expression "composite images" means generating one image by adding a weight-assigned high-frequency enhanced image to a weight-assigned microstructure enhanced image for each of pixels. "Assigning a weight" may include a situation in which a weighting factor by which a high-frequency enhanced image is multiplied is equal to a weighting factor by which a microstructure enhanced image is multiplied. Generating a high-frequency enhanced image and generating a microstructure enhanced image both mean generating an image through an image enhancement process.

Figure 4D:
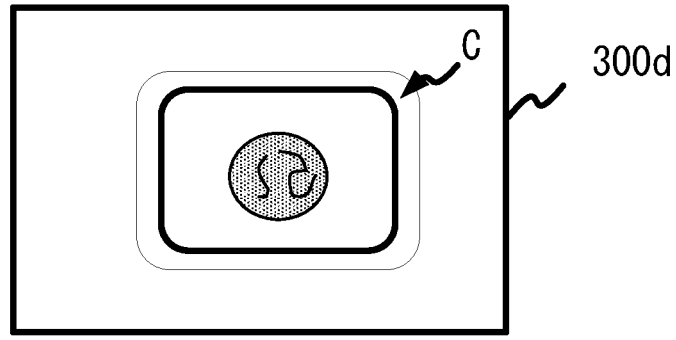
FIG. 4D is yet another explanatory diagram for an effect of image processing.

Adding a microstructure enhanced image to a high-frequency enhanced image suppresses a halo. In addition, a microstructure that was lost when generating the high-frequency enhanced image is reconstructed. Thus, the image processing apparatus 20 depicted in FIG. 3 can suppress, through the image processing, an artifact that arises in the boundary portion between an observation sample and a background. Hence, a decrease in the resolving power for a microstructure that is caused by an artifact can be suppressed. In addition, a decrease in the resolving power that is associated with an artifact reduction can be avoided. Accordingly, the artifact can be reduced with the resolving power maintained. FIG. 4D depicts a schematic diagram of an image 300d output from the corrected-image generation unit 53. The image 300b in FIG. 4B and the image 300c in FIG. 4C have been summed, so the halo surrounding the cell C has been reduced, and the microstructures in the cell C have been reconstructed.

Figure 5:
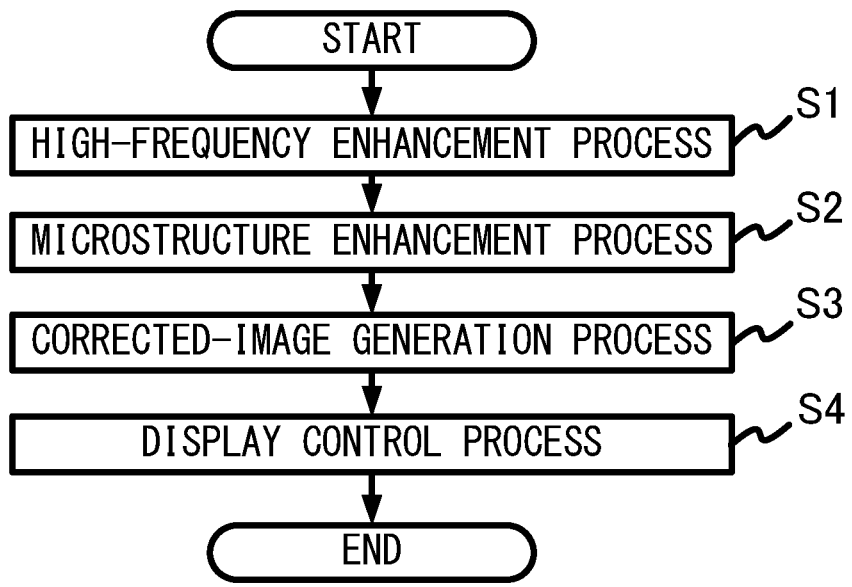
FIG. 5 is an example of a flowchart of processes performed by an image processing apparatus 20.
Figure 6:
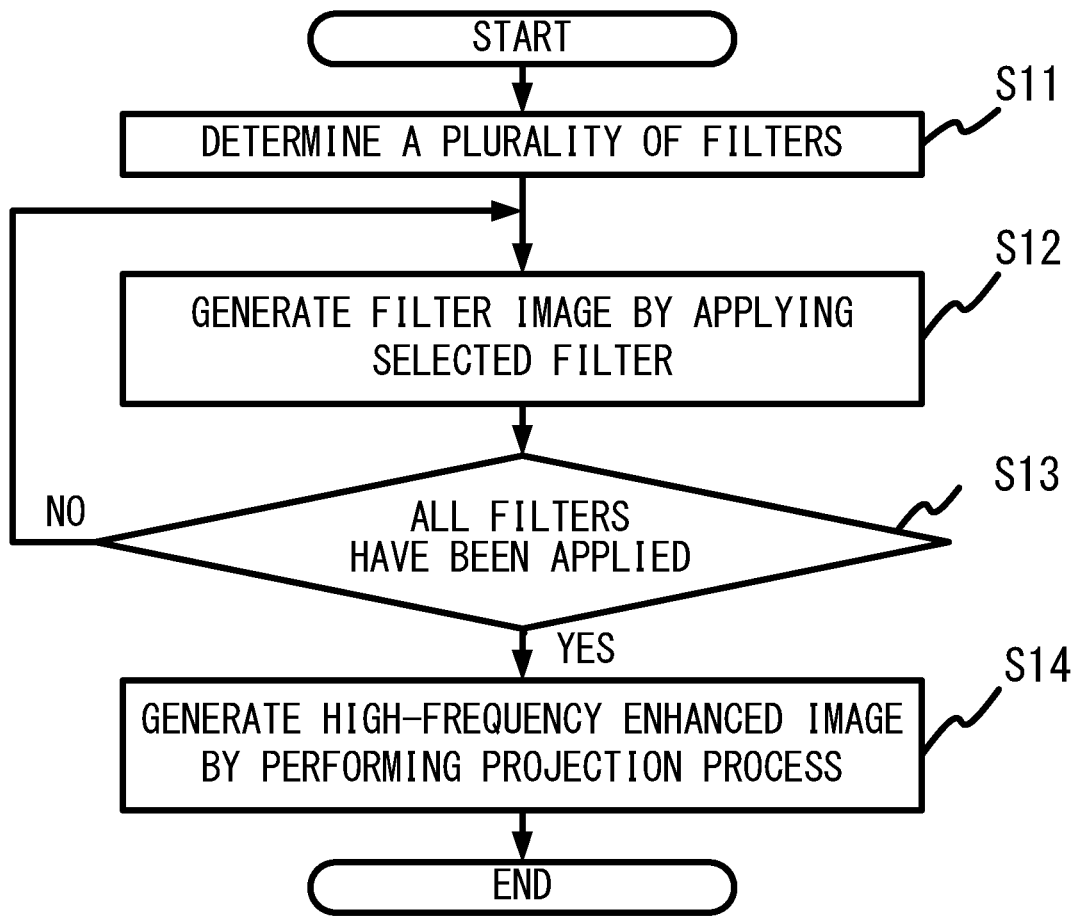
FIG. 6 is an example of a flowchart of a high-frequency enhancement process.
Figure 10:
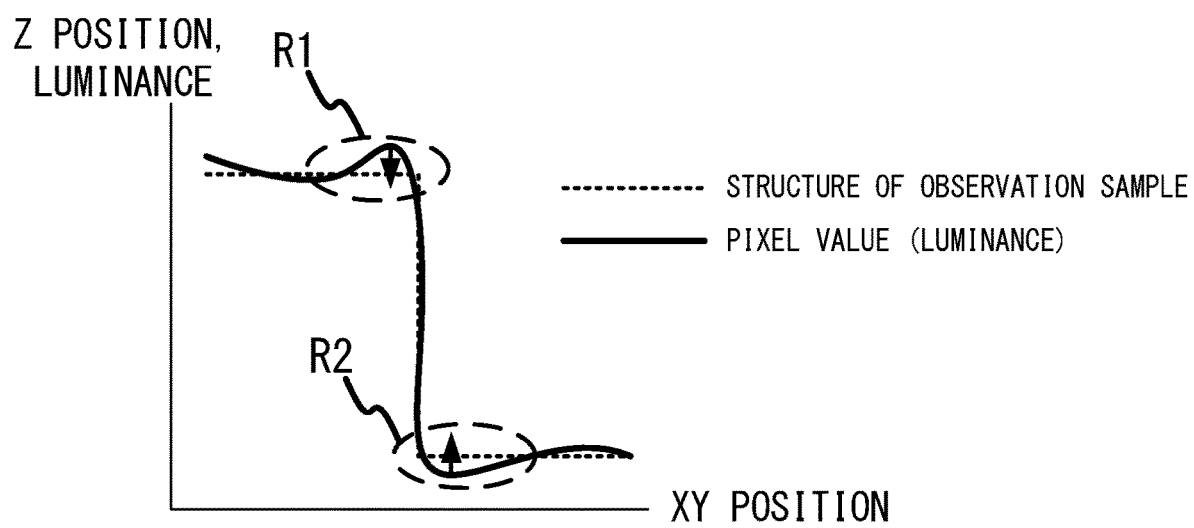
FIG. 10 exemplifies a relationship between the structure of an observation sample and the pixel value of an image in which an artifact has arisen.
Figure 11:
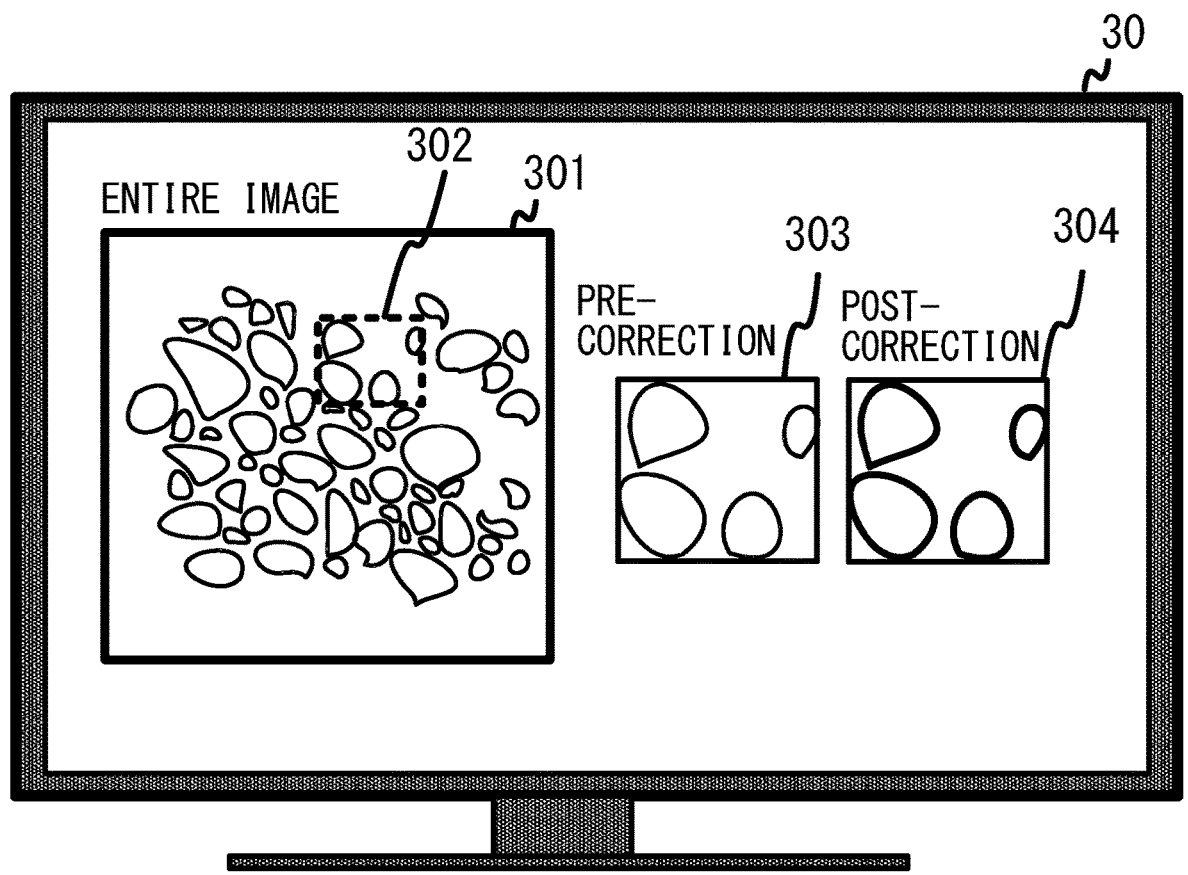
FIG. 11 illustrates an example of a screen displaying a corrected image.
Figure 12:
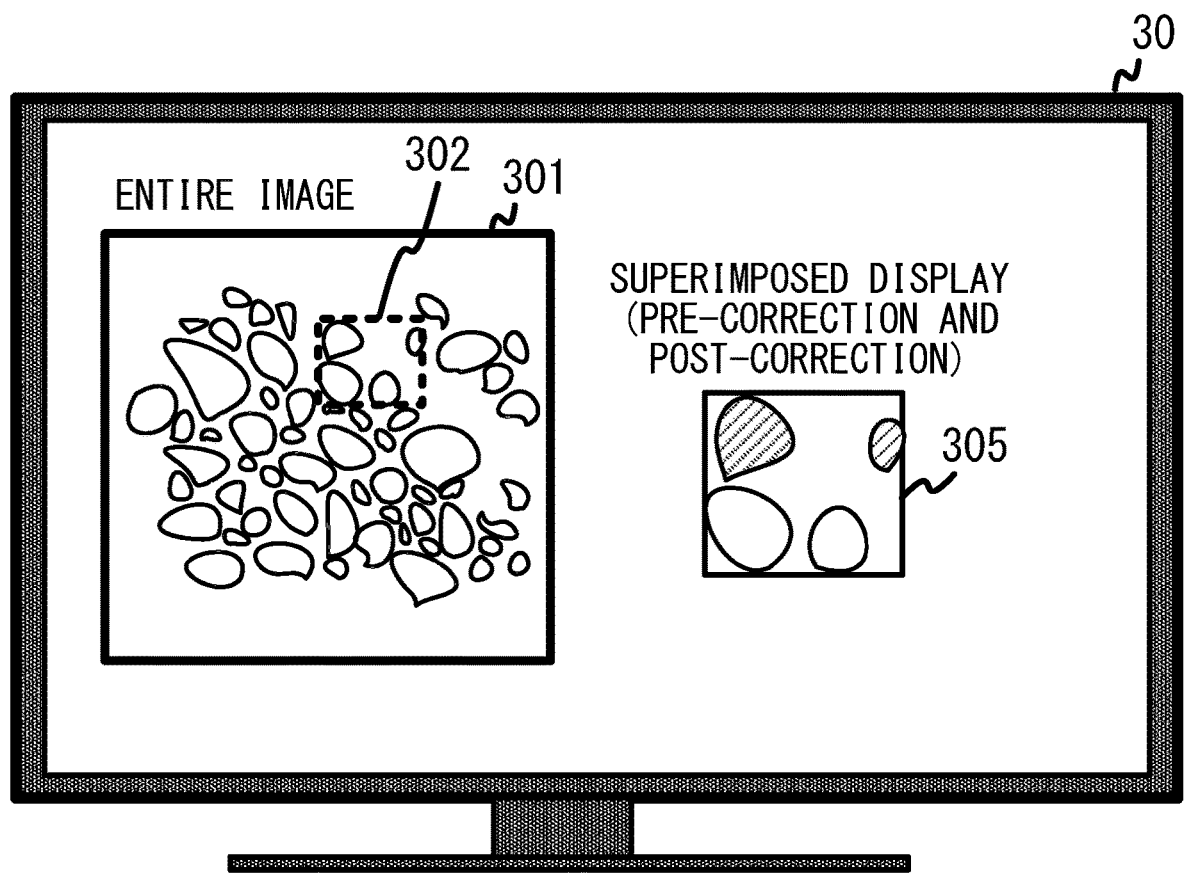
FIG. 12 illustrates another example of a screen displaying a corrected image.

FIG. 5 is an example of a flowchart of processes performed by the image processing apparatus 20. FIG. 6 is an example of a flowchart of a high-frequency enhancement process. FIGS. 7A-7C, FIGS. 8A-8C, and FIGS. 9A and 9B exemplify a plurality of filters used in the high-frequency enhancement process. FIG. 10 exemplifies a relationship between the structure of an observation sample and the pixel value of an image in which an artifact has arisen. FIGS. 11 and 12 exemplify a screen displaying a corrected image. With reference to FIGS. 5-12, the following describes processes performed by the microscope system 1 in detail by taking an example of a situation in which the microscope apparatus 10 obtains a phase-contrast image.

The processes in FIG. 5 are an example of an image processing method implemented by the image processing apparatus 20. For example, the processes may start when the user of the microscope system 1 operates the input apparatus so as to cause the processor 21 to execute a predetermined application program. The processes depicted in FIG. 5 include a high-frequency enhancement process performed by the high-frequency enhancement unit 51 (step S1), a microstructure enhancement process performed by the microstructure enhancement unit 52 (step S2), a corrected-image generation process performed by the corrected-image generation unit 53 (step S3), and a display control process performed by a display control unit (not illustrated) (step S4). The processes of steps S1 and S2 may be performed temporally in parallel. Alternatively, the process of step S1 may be performed after the process of step S2 is performed.

When the high-frequency enhancement process starts in step S1, the image processing apparatus 20 first determines, as indicated in FIG. 6, a plurality of filters (step S11). The plurality of filters are each a filter used for a process to enhance high-frequency components of a microscopic image relative to low-frequency components thereof. For example, the plurality of filters may be high-pass filters (HPFs). The plurality filters desirably have an anisotropy, and it is also desirable that the plurality of filters each have a different anisotropy. It is especially desirable that the reference directions of the plurality of filters be different from each other. In other words, the plurality of filters each desirably have a directivity in a different direction. This is because the direction of an artifact (halo) that arises in a boundary portion corresponds to a boundary shape. When the plurality of filters each have a directivity in a different direction, the image processing apparatus 20 can address artifacts that arise in association with various boundary shapes.

A boundary frequency defining high-frequency components and low-frequency components for the plurality of filters is desirably determined in accordance with the characteristics of the microscope apparatus 10, in particular characteristics pertaining to resolution. Thus, when determining a plurality of filters, the image processing apparatus 20 may determine a boundary frequency for the plurality of filters in accordance with, for example, a Nyquist frequency dependent on the pixel pitch of the digital camera 11 of the microscope apparatus 10. Alternatively, the boundary frequency may be determined in accordance with a cut-off frequency dependent on the numerical aperture of the phase-contrast objective 14 of the microscope apparatus 10. Under this condition, the image processing apparatus 20 may determine filters having the determined boundary frequency as filters to be used in the high-frequency enhancement process. For example, the boundary frequency may be half the Nyquist frequency or half the cut-off frequency. Furthermore, frequencies change in accordance with a magnification used in observation of an object. Accordingly, for example, frequency distribution may be determined by Fourier-transforming an image, and a frequency that is a peak of the frequency distribution may be defined as a boundary frequency.

Figure 7A:
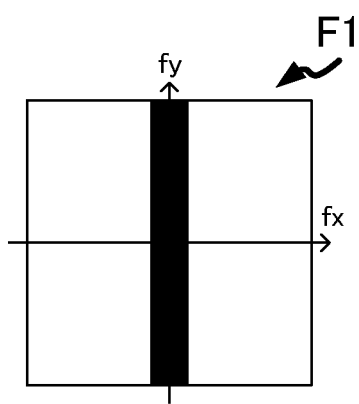
FIG. 7A illustrates an example of a filter among a plurality of filters used in a high-frequency enhancement process.
Figure 7B:
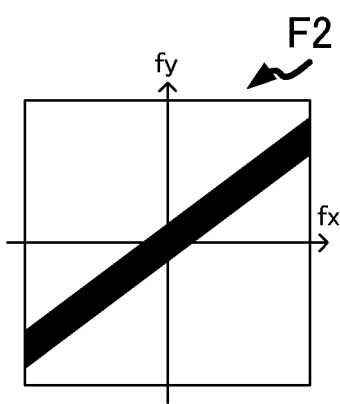
FIG. 7B illustrates an example of another filter among a plurality of filters used in a high-frequency enhancement process.
Figure 7C:
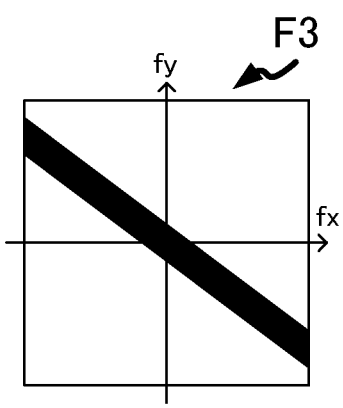
FIG. 7C illustrates an example of still another filter among a plurality of filters used in a high-frequency enhancement process.
Figure 8A:
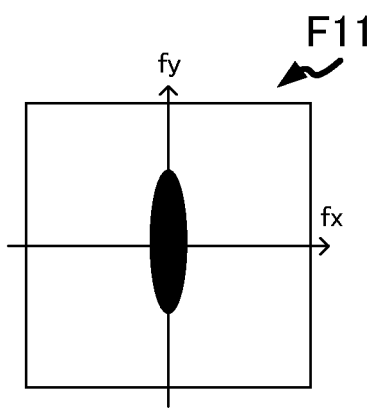
FIG. 8A illustrates an example of a filter among another plurality of filters used in a high-frequency enhancement process.
Figure 8B:
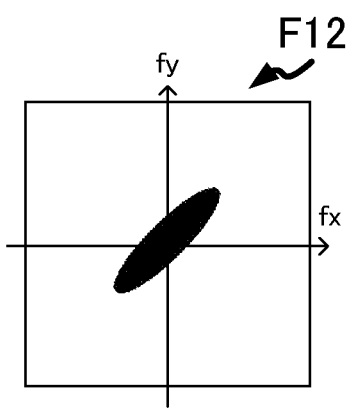
FIG. 8B illustrates an example of another filter among another plurality of filters used in a high-frequency enhancement process.
Figure 8C:
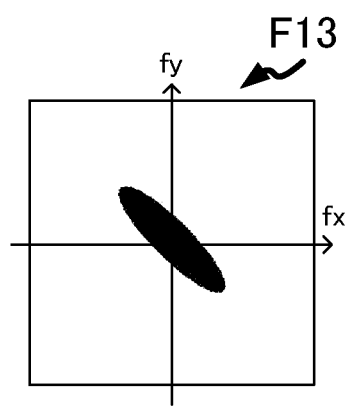
FIG. 8C illustrates an example of still another filter among another plurality of filters used in a high-frequency enhancement process.
Figure 9A:
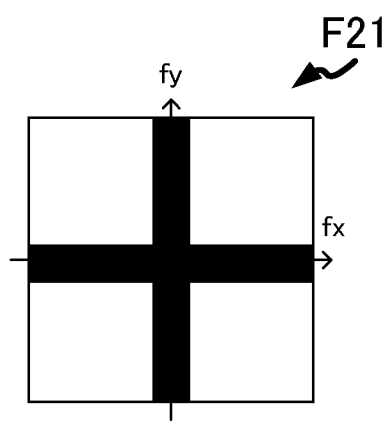
FIG. 9A illustrates an example of one filter of still another plurality of filters used in a high-frequency enhancement process.
Figure 9B:
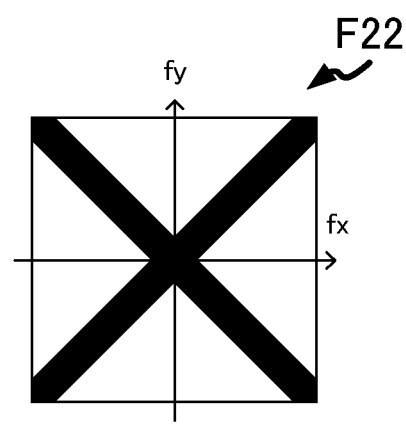
FIG. 9B illustrates an example of the other filter of still another plurality of filters used in a high-frequency enhancement process.

For example, the plurality of filters may be frequency space filters to be applied to an image obtained by Fourier-transforming a microscopic image, such as those depicted in FIGS. 7A-7C, FIGS. 8A-8C, and FIGS. 9A and 9B. Alternatively, the plurality of filters may be real space filters to be directly applied to a microscopic image (i.e., convolution core or kernel). It may be determined which of the frequency space filters or the real space filters should be used, in consideration of the time required for Fourier transform.

fx and fy in FIGS. 7A-7C, FIGS. 8A-8C, and FIGS. 9A and 9B respectively indicate a frequency in an x direction and a frequency in a y direction. White regions and black regions in FIGS. 7A-7C, FIGS. 8A-8C, and FIGS. 9A and 9B respectively indicate regions that transmit frequency components and regions that block or attenuate frequency components. The plurality of filters are desirably a combination of filters F1, F2, and F3, as indicated in FIGS. 7A-7C. Alternatively, the plurality of filters may be a combination of filters F11, F12, and F13, as indicated in FIGS. 8A-8C. Thus, the plurality of filters are desirably three or more filters. However, the plurality of filters may be two filters that each have directivities in two or more directions as depicted in FIGS. 9A and 9B (a combination of filters F21 and F22).

In addition, the plurality of filters may be filters that can be applied to information that has been encoded through another type of transform such as wavelet transform or discrete cosine transform.

Upon a plurality of filters being determined, the image processing apparatus 20 generates a filter image by applying a filter selected from the plurality of filters (step S12). In this case, when the filter is a real space filter, a filter image is generated by applying the filter to the microscopic image. When the filter is a frequency space filter, the filter is applied to an image obtained by Fourier-transforming the microscopic image. Then, the result is inverse-Fourier-transformed so as to generate a filter image. Alternatively, the image processing apparatus 20 may generate one filter image by applying the plurality of filters to the microscopic image.

In addition, the image processing apparatus 20 determines whether all of the filters have been applied (step S13), and repeats steps S12 and S13 until all of the plurality of filters determined in step S11 are applied. In this way, a plurality of filter images, more specifically as many filter images as are equal to the number of the plurality of filters, are generated.

Upon a plurality of filter images being generated, the image processing apparatus 20 generates a high-frequency enhanced image by performing a projection process (step S14). In this case, the image processing apparatus 20 generates a high-frequency enhanced image by performing a projection process based on the plurality of filter images. The projection process based on the plurality of filter images is a process of generating one image by generating individual pixels of the one image from a plurality of pixels of the plurality of filter images that correspond to each other. In this example, the one generated image is a high-frequency enhanced image.

The projection process based on the plurality of filter images may be a process of generating one image by summing the plurality of filter images for each pixel or a process of generating one image by summing, for each pixel, the plurality of filter images with weights assigned thereto. Alternatively, the projection process may be a process of generating one image from a plurality of filter images by obtaining, for each pixel, statistical values (maximum value, minimum value, median value, and mode value). For example, an image may be formed with the maximum values obtained for the individual pixels being defined as pixel values, so that undershoot of a halo (region R2 in FIG. 10) can be sufficiently suppressed. Alternatively, an image may be formed with the minimum values obtained for the individual pixels being defined as pixel values, so that overshoot of a halo (region R1 in FIG. 10) can be sufficiently suppressed. Note that undershoot refers to a phenomenon where luminance that is lower than luminance corresponding to an actual structure is detected at an edge portion. Overshoot refers to a phenomenon where luminance that is higher than luminance corresponding to an actual structure is detected at an edge portion.

In the high-frequency enhancement process depicted in FIG. 6, as described above, the projection process is performed for a plurality of filter images obtained by a plurality of filters having directivities in different directions. In this way, a halo (artifact) which could arise in any direction can be reduced. In the meantime, in step S14, in addition to the plurality of filter images, the microscopic image may undergo the projection process. Accordingly, the image processing apparatus 20 may generate a high-frequency enhanced image by performing the projection process based at least on a plurality of filter images.

Upon the high-frequency enhancement process being finished, the image processing apparatus 20 performs the microstructure enhancement process (step S2). The microstructure enhancement process may be a difference-type edge extraction process or a zero-cross-type edge extraction process. For example, the difference-type edge extraction process may be a difference operation for a microscopic image and an image obtained by making a pixel shift for the microscopic image. It is sufficient if the pixel shift amount is larger than 0, and it may be less than 1 pixel, and the shift direction is not particularly limited. For example, the difference-type edge extraction process may be matrix calculation using a first-order differential filter such as a differential filer, a Roberts filter, a Sobel filter, or a Prewitt filter. For example, the zero-cross-type edge extraction process may be matrix calculation using a second-order differential filter such as a Laplacian filter. Irrespective of which of the difference-type edge extraction process or the zero-cross-type edge extraction process is used, the edge extraction process is desirably performed a plurality of times for different directions, so that edges in any directions can be extracted. When the structure of a specimen S changes only in a certain direction, a filter to be used in the microstructure enhancement process may be selected in accordance with the certain direction.

Upon a microstructure enhanced image being generated through the microstructure enhancement process, the image processing apparatus 20 performs the corrected-image generation process (step S3). In this case, the image processing apparatus 20 generates a corrected image by compositing the high-frequency enhanced image and the microstructure enhanced image. More specifically, the image processing apparatus 20 may add the high-frequency enhanced image and the microstructure enhanced image to each other or add the high-frequency enhanced image and the microstructure enhanced image to each other with weights assigned thereto.

Upon a corrected image being generated, the image processing apparatus 20 performs the display control process (step S4). In this case, upon a corrected image being generated through the corrected-image generation process, the image processing apparatus 20 causes the display apparatus 30 to display the corrected image. The image processing apparatus 20 may cause the display apparatus 30 to display only the corrected image or cause the display apparatus 30 to display the corrected image and the image before correction (microscopic image). For example, as depicted in FIG. 11, the image processing apparatus 20 may cause an image before correction and an image after correction (images 303 and 304) to be displayed next to each other. In this way, the effect of halo reduction and the effect of reconstruction of a microstructure can be easily checked. For example, as indicated in FIG. 12, the image processing apparatus 20 may cause an image before correction and an image after correction to be overlaid on each other so as to be displayed as one image 305. In this way, it can be checked whether misalignment has occurred between the images due to the correction. Displaying an image before correction and an image after correction with different colors may allow the presence/absence of misalignment to be checked more easily.

FIGS. 11 and 12 illustrate examples in which a corrected image of a region 302 of interest within an entire image 301 is displayed. Image processing may be performed like this for a portion of an image obtained by the microscope apparatus 10, so that an image processing result can be obtained in a shorter time.

Second Embodiment

Figure 13:
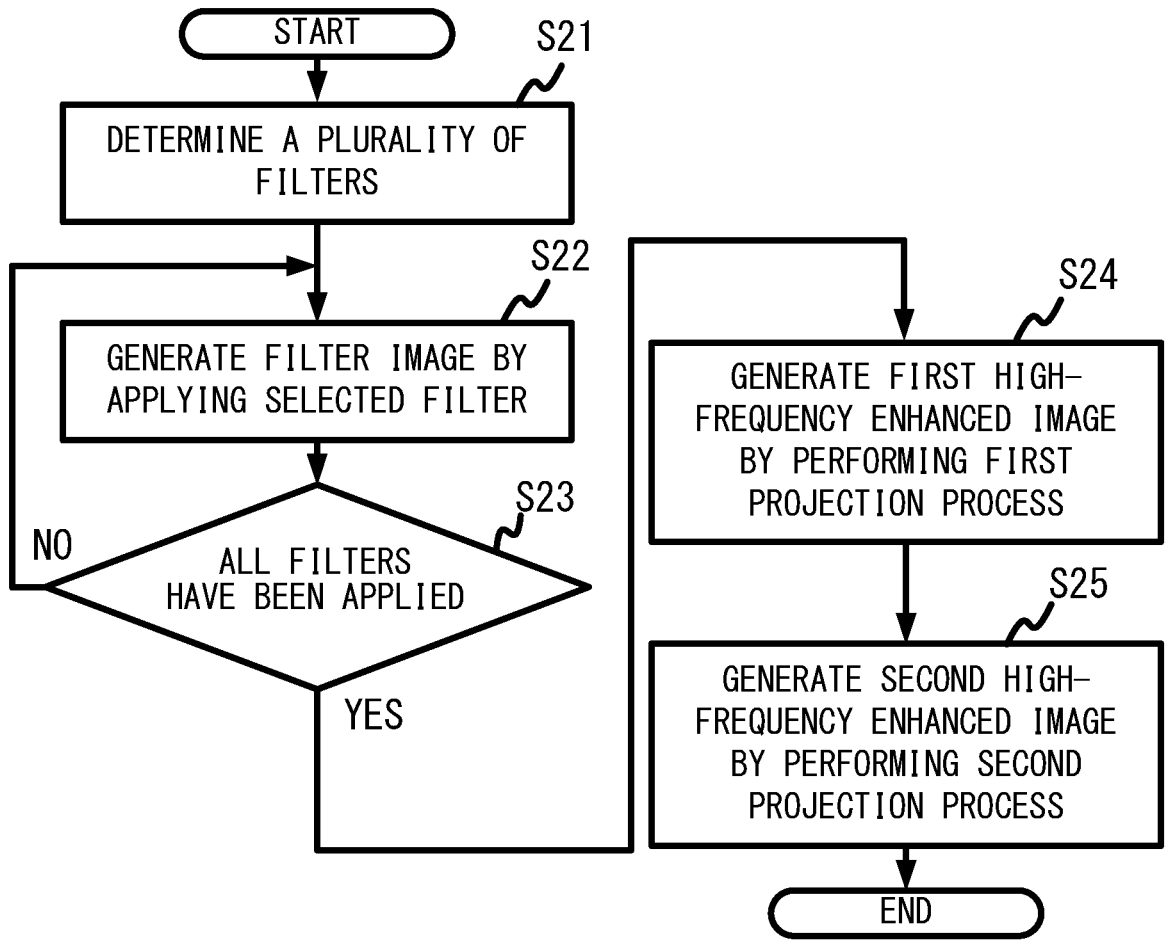
FIG. 13 is another example of a flowchart of a high-frequency enhancement process.

FIG. 13 is an example of a flowchart of a high-frequency enhancement process. In the present embodiment, the image processing apparatus 20 performs a high-frequency enhancement process depicted in FIG. 13, instead of the high-frequency enhancement process depicted in FIG. 6.

Upon starting the high-frequency enhancement process depicted in FIG. 13, the image processing apparatus 20 determines a plurality of filters (step S21) and generates a plurality of filter images by using the plurality of filters (steps S22 and S23). Note that the processes of steps S21-S23 are similar to those of steps S1-S3 depicted in FIG. 6.

Then, the image processing apparatus 20 generates a first high-frequency enhanced image by performing a first projection process based at least on the plurality of filter images (step S24). For example, this process may be the same as step S4 in FIG. 6.

In addition, the image processing apparatus 20 generates a second high-frequency enhanced image by performing a second projection process based at least on the plurality of filter images (step S25). The second projection process may be different from the first projection process.

When the first projection process is a process of generating a first high-frequency enhanced image from the plurality of filter images by obtaining a maximum value for each pixel, the second projection process is desirably a process of generating a second high-frequency enhanced image from the plurality of filter images by obtaining a minimum value for each pixel. Thus, the first and second high-frequency enhanced images, i.e., high-frequency enhanced images, will be composited as a microstructure enhanced image. In the present embodiment, accordingly, the image processing apparatus 20 can obtain a corrected image in which both undershoot and overshoot are reduced. Hence, a decrease in the resolving power for a microstructure that is caused by a halo in the boundary portion between an observation sample and a background can be suppressed more effectively than in the first embodiment.

Third Embodiment

Figure 14:
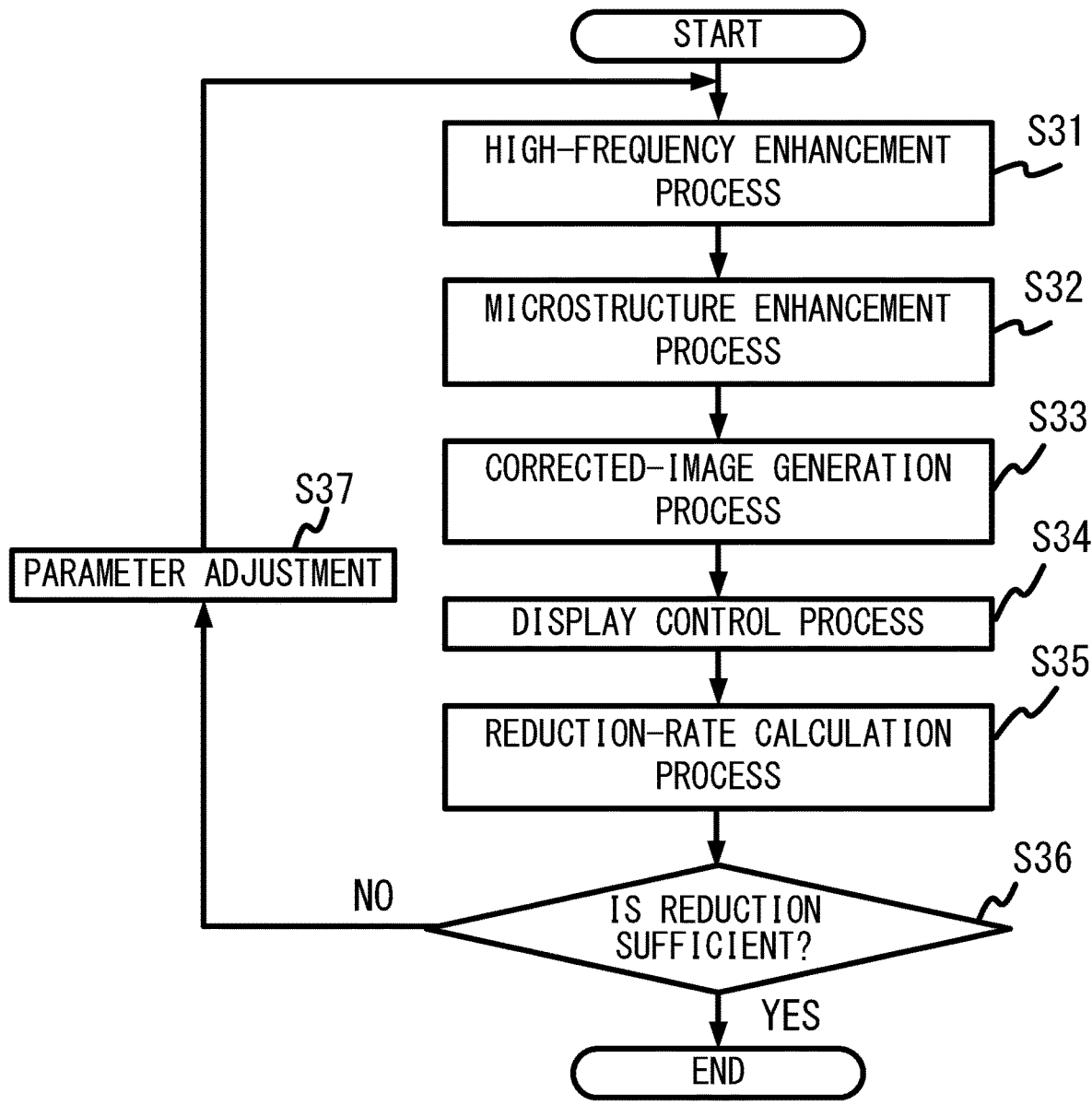
FIG. 14 is another example of a flowchart of processes performed by an image processing apparatus 20.

FIG. 14 is an example of a flowchart of processes performed by the image processing apparatus 20 in the present embodiment. Upon the processes depicted in FIG. 14 being started, the image processing apparatus 20 performs a high-frequency enhancement process, a microstructure enhancement process, a corrected-image generation process, and a display control process (steps S31-S34). These processes are similar to those of steps S1-S4 in FIG. 5.

In the present embodiment, after performing the display control process, the image processing apparatus 20 performs a reduction-rate calculation process (step S35). In this case, on the basis of a microscopic image and a corrected image, the image processing apparatus 20 calculates the rate of reduction of a halo included in the corrected image. More specifically, for example, the image processing apparatus 20 may extract, for each of the microscopic image and the corrected image, an image of the vicinity of a boundary portion, and calculate the rate of reduction of a halo by comparing the extracted images. The vicinity of the boundary portion may be specified using, for example, a microstructure enhanced image. For example, the rate of reduction can be calculated as described in the following. Descriptions are given on the assumption that the left portion in FIG. 10 with high luminance is the inside of the observation sample, and the portion in FIG. 10 with low luminance is a background portion. The luminance difference between the average luminance of the inside of the observation sample before the image processing and the maximum luminance of the overshoot portion raised by a halo is defined as an overshoot amount A. The luminance difference between the average luminance of the background portion before the image processing and the minimum luminance of the lowered undershoot portion is defined as an undershoot amount B. A' and B' are respectively an overshoot amount and an undershoot amount obtained when the halo is reduced through the image processing of steps S31-S33 in FIG. 14. In this case, the rate of reduction is expressed by $((A+B)-(A'+B'))/(A+B)$. The rate of reduction for only overshoot can be expressed by $(A-A')/A$. The rate of reduction for only undershoot can be expressed by $(B-B')/B$.

On the basis of the rate of reduction, the image processing apparatus 20 determines whether the halo has been reduced (step S35). For example, the determination may be made by comparing the rate of reduction with a threshold or threshold range determined in advance. When determining in step S35 that the halo has been reduced, the image processing apparatus 20 ends the processes depicted in FIG. 14.

When determining in step S35 that the halo has not been reduced (NO in step S36), the image processing apparatus 20 adjusts parameters for the image processing (step S37). Then, the processes of steps S31-S36 are repeated. The parameter adjustment may be performed by the image processing apparatus 20 on the basis of user input or may be performed by the image processing apparatus 20 without user input. The parameters for the image processing that are to be adjusted include parameters used for the high-frequency enhancement process, parameters used for the microstructure enhancement process, and parameters used for the corrected-image generation process. The image processing apparatus 20 changes at least one of these parameters.

The parameters used in the high-frequency enhancement process may include, for example, a window function used when calculating a filter coefficient for a high-pass filter, and the cut-off frequency of the high-pass filter. The parameters used in the microstructure enhancement process may include, for example, a pixel shift amount and a pixel shift direction. The parameters used in the corrected-image generation process include, for example, a weighting factor. The parameters are not limited to such examples. In addition, a new parameter may be introduced in the middle of the repetitive processes.

In the present embodiment, when determining that the halo has not been reduced, the image processing apparatus 20 regenerates the corrected image by adjusting the parameters. The processes are repeated until it is determined that the halo has been reduced. Hence, the halo can be reduced more reliably.

The embodiments described above indicate specific examples to facilitate understanding of the invention, and the present invention is not limited to these embodiments. Some of the embodiments described above may be applied to other embodiments so as to provide still other embodiments of the invention. Various modifications or changes can be made to the image processing method, the computer readable medium, the image processing apparatus, the image processing system, and the microscope system without departing from the recitation in the claims.

Figure 15:
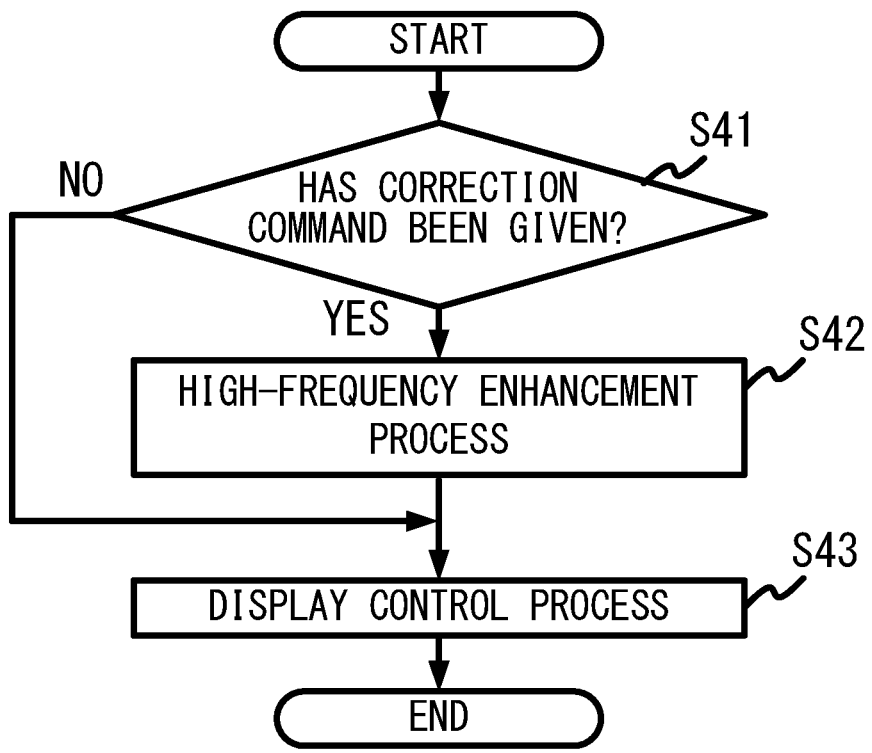
FIG. 15 is still another example of a flowchart of processes performed by an image processing apparatus 20.

The embodiments described above indicate examples in which an artifact is reduced in the high-frequency enhancement process, and a microstructure stored in the microstructure enhancement process is added so as to reduce a decrease in the resolving power for the microstructure that is caused by the artifact. However, when information on a microstructure is not lost through the high-frequency enhancement process, the microstructure enhancement process may be omitted as depicted in FIG. 15. Also in this case, as indicated in, for example, the second embodiment, a decrease in the resolving power for a microstructure can be further suppressed when the high-frequency enhancement process includes a plurality of projection processes.

FIG. 15 depicts an example in which a high-frequency enhanced image is generated only when the input apparatus has input information commanding to reduce an artifact that has arisen in a microscopic image to the image processing apparatus 20 (YES in step S41). In this way, the image processing can be performed only when an artifact needs to be reduced. For example, when a fluorescence image is input as a microscopic image, the fluorescence image can be quickly displayed by omitting the image processing.

Figure 16:
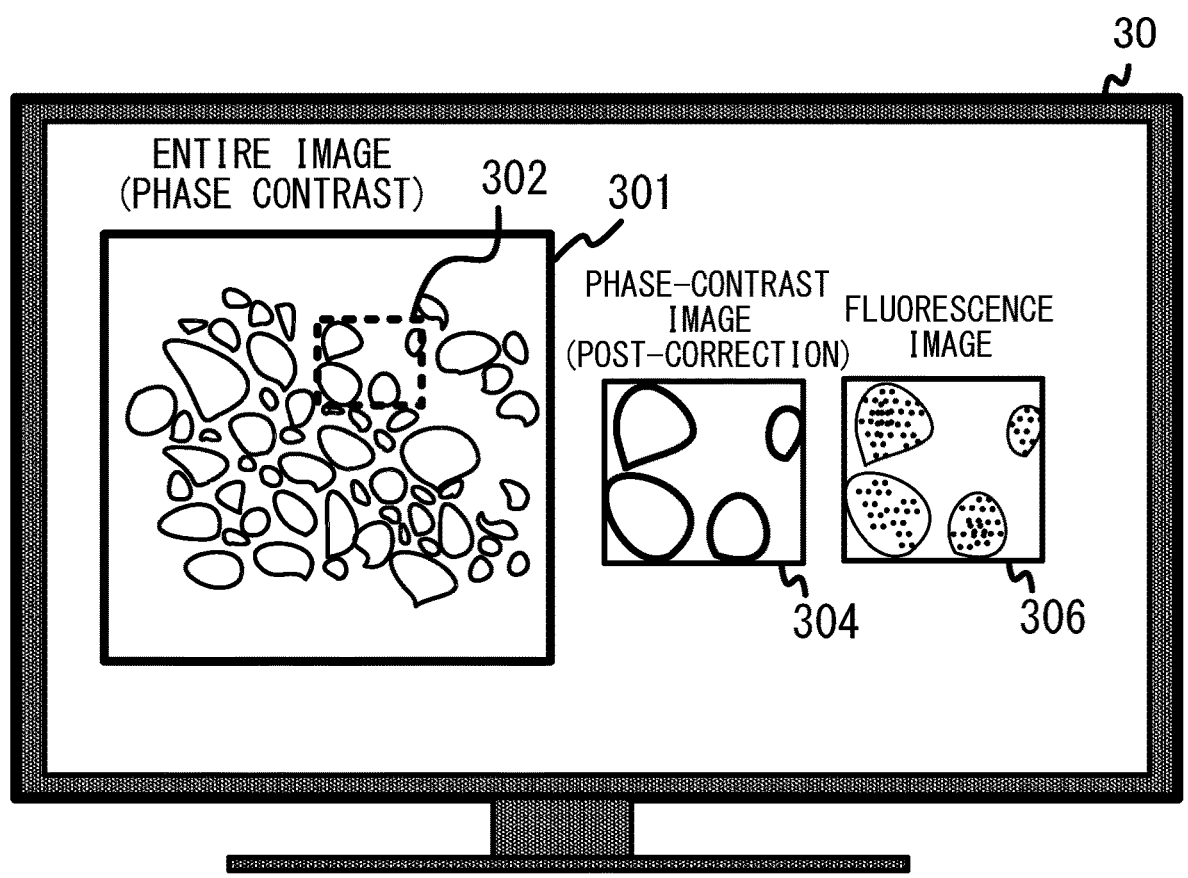
FIG. 16 illustrates still another example of a screen displaying a corrected image.
Figure 17:
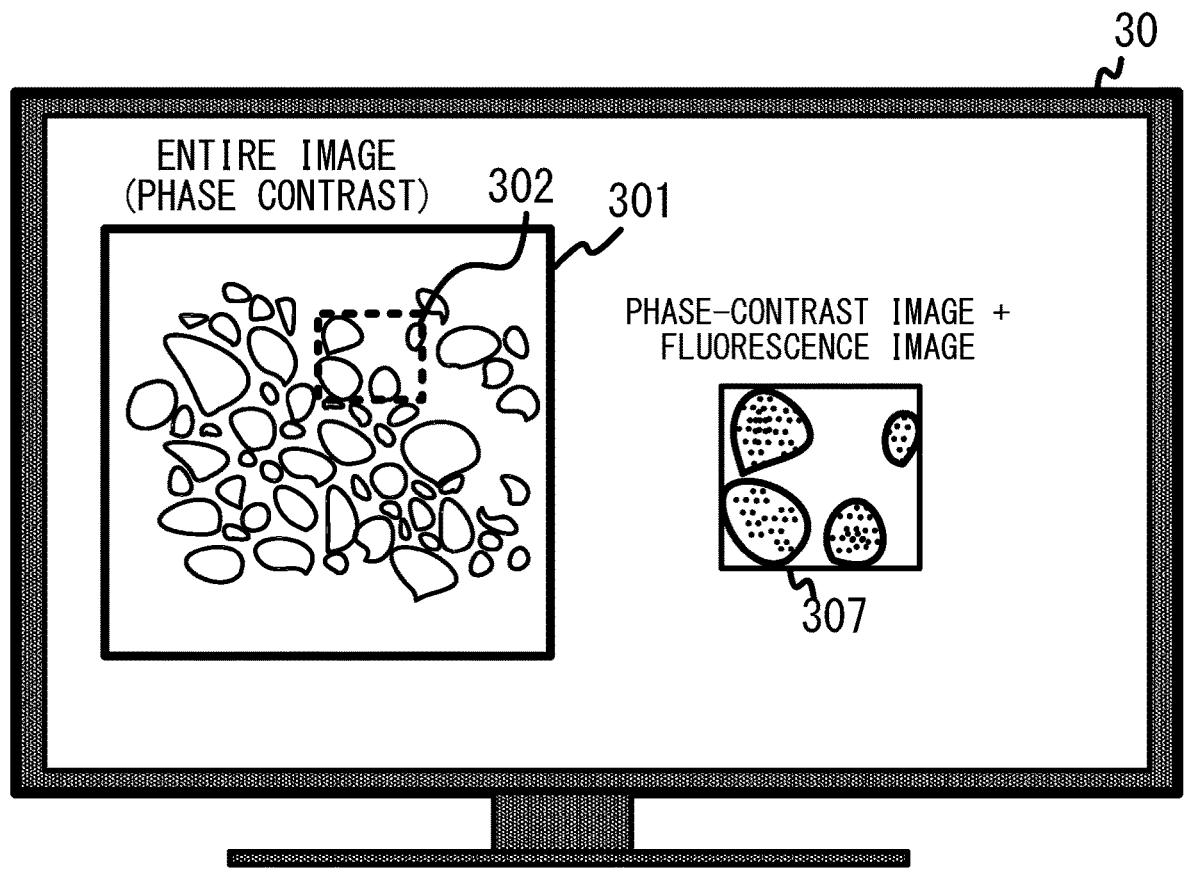
FIG. 17 illustrates yet another example of a screen displaying a corrected image.

The embodiments described above indicate examples in which the image processing apparatus 20 causes the display apparatus 30 to display a phase-contrast image. However, as depicted in FIGS. 16 and 17, the image processing apparatus 20 may cause the display apparatus 30 to display a fluorescence image in addition to a phase-contrast image. In this case, the phase-contrast image is desirably a corrected image. Accordingly, the user can check the structure of a specimen S and the spatial distribution of a portion stained by a fluorescence dye. FIG. 16 depicts an example in which the image processing apparatus 20 causes the display apparatus 30 to display a fluorescence image (image 306) and a corrected image constituted by a phase-contrast image (image 304) next to each other. FIG. 17 depicts an example in which the image processing apparatus 20 causes the display apparatus 30 to display an image 307 obtained by overlaying a corrected image and a fluorescence image on each other.

The embodiments described above indicate examples in which the image processing apparatus 20 performs the image processing for a phase-contrast image. However, the image processing apparatus 20 may perform the image processing for a bright field image obtained using oblique illumination, rather than for a phase-contrast image. Also in this case, a decrease in the resolving power for a microstructure that is caused by an artifact can be suppressed.

When the digital camera 11 is a color camera of a 1-CCD type, the above-described image processing is desirably performed for information on G among information on R, G, and B. This is because a color camera of a 1-CCD type, as a general rule, uses only information on G for spatial information. In this way, a high S/N ratio can be attained by a combination of color information before the image processing and spatial information that has undergone the image processing. When the digital camera 11 is a color camera of a 3-CCD type, the above-described image processing may be performed for information on each of R, G, and B.

What is claimed is:

1. An image processing method comprising:
    generating two images by performing two image enhancement processes for a microscopic image; and
    generating a corrected image obtained by compositing the two images, wherein
    the generating the two images includes
        generating a high-frequency enhanced image in which high-frequency components of the microscopic image are enhanced relative to low-frequency components of the microscopic image that have a lower frequency than the high-frequency components, and
        generating a microstructure enhanced image in which a microstructure in an observation sample included in the microscopic image is enhanced.

2. The image processing method of claim 1, wherein
    the generating the high-frequency enhanced image includes
        determining a plurality of different filters having an anisotropy,
        generating a plurality of filter images by applying the plurality of filters to the microscopic image, and
        generating the high-frequency enhanced image by performing a projection process based at least on the plurality of filter images.

3. The image processing method of claim 2, wherein
    the plurality of filters are determined on the basis of a characteristic of a microscope apparatus that generates the microscopic image.

4. The image processing method of claim 2, wherein
the microscopic image is a phase-contrast image obtained by a phase-contrast microscope.

5. The image processing method of claim 2, further comprising:
calculating a rate of reduction of an artifact included in the corrected image on the basis of the microscopic image and the corrected image;
determining, on the basis of the rate of reduction, whether the artifact has been reduced; and
regenerating the corrected image by changing at least one of parameters used in the process of generating the two images, when it is determined that the artifact has not been reduced.

6. The image processing method of claim 1, wherein
the generating the high-frequency enhanced image includes
determining a plurality of different filters having an anisotropy,
generating a plurality of filter images by applying the plurality of filters to the microscopic image, and
generating a first high-frequency enhanced image by performing a first projection process based at least on the plurality of filter images, and
generating a second high-frequency enhanced image by performing a second projection process based at least on the plurality of filter images, wherein
the second projection process is different from the first projection process, and
the high-frequency enhanced image includes the first and second high-frequency enhanced images.

7. The image processing method of claim 6, wherein
the plurality of filters are determined on the basis of a characteristic of a microscope apparatus that generates the microscopic image.

8. The image processing method of claim 6, wherein
the microscopic image is a phase-contrast image obtained by a phase-contrast microscope.

9. The image processing method of claim 6, further comprising:
calculating a rate of reduction of an artifact included in the corrected image on the basis of the microscopic image and the corrected image;
determining, on the basis of the rate of reduction, whether the artifact has been reduced; and
regenerating the corrected image by changing at least one of parameters used in the process of generating the two images, when it is determined that the artifact has not been reduced.

10. The image processing method of claim 1, wherein
the microscopic image is a phase-contrast image obtained by a phase-contrast microscope.

11. The image processing method of claim 1, further comprising:
calculating a rate of reduction of an artifact included in the corrected image on the basis of the microscopic image and the corrected image;
determining, on the basis of the rate of reduction, whether the artifact has been reduced; and
regenerating the corrected image by changing at least one of parameters used in the process of generating the two images, when it is determined that the artifact has not been reduced.

12. A non-transitory computer readable medium having stored therein a program for causing a computer to perform:
a process of generating two images by performing two image enhancement processes for a microscopic image, the process of generating including
generating a high-frequency enhanced image in which high-frequency components of the microscopic image are enhanced relative to low-frequency components of the microscopic image that have a lower frequency than the high-frequency components, and
generating a microstructure enhanced image in which a microstructure in an observation sample included in the microscopic image is enhanced; and
a process of generating a corrected image obtained by compositing the two images.

13. An image processing apparatus comprising:
an image enhancement unit that generates two images by performing two image enhancement processes for a microscopic image; and
a corrected-image generation unit that generates a corrected image obtained by compositing the two images, wherein
the image enhancement unit
generates a high-frequency enhanced image in which high-frequency components of the microscopic image are enhanced relative to low-frequency components of the microscopic image that have a lower frequency than the high-frequency components, and
generates a microstructure enhanced image in which a microstructure in an observation sample included in the microscopic image is enhanced.

14. An image processing system comprising:
the image processing apparatus of claim 13; and
a display apparatus that displays the corrected image.

15. The image processing system of claim 14, wherein
the image processing apparatus causes the display apparatus to display the corrected image and the microscopic image such that the corrected image and the microscopic image are overlaid on each other or positioned next to each other.

16. A microscope system comprising:
the image processing apparatus of claim 13; and
a microscope apparatus that obtains the microscopic image.

17. The microscope system of claim 16, wherein
the microscope apparatus includes a phase-contrast microscope that obtains a phase-contrast image as the microscopic image.

18. The microscope system of claim 17, wherein
the microscope apparatus includes a florescence microscope that obtains a fluorescence image.

19. The microscope system of claim 18, further comprising:
a display apparatus, wherein
the image processing apparatus causes the display apparatus to display the fluorescence image and the corrected image such that the fluorescence image and the corrected image are overlaid on each other or positioned next to each other.

20. A microscope system comprising:
a microscope apparatus that obtains a microscopic image;
an image processing apparatus that generates a corrected image from the microscopic image obtained by the microscope apparatus;
a display apparatus that displays the corrected image generated by the image processing apparatus; and
an input apparatus that inputs information corresponding to a user operation to the image processing apparatus, wherein when the input apparatus has input information commanding to reduce an artifact that has arisen in the microscopic image, the image processing apparatus generates a high-frequency enhanced image in which high-frequency components of the microscopic image are enhanced relative to low-frequency components of the microscopic image that have a lower frequency than the high-frequency components and a microstructure enhanced image in which a microstructure in an observation sample included in the microscopic image is enhanced and generates the corrected image obtained by compositing the high-frequency enhanced image and the microstructure enhanced image.

* * * * *